United States Patent
Horng et al.

(10) Patent No.: US 10,205,356 B2
(45) Date of Patent: Feb. 12, 2019

(54) EXTERNAL ROTOR MOTOR

(71) Applicant: Sunonwealth Electric Machine Industry Co., Ltd., Kaohsiung (TW)

(72) Inventors: Alex Horng, Kaohsiung (TW); Tso-Kuo Yin, Kaohsiung (TW); Duo-Nian Shan, Kaohsiung (TW); Bo-Wei Chiou, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 581 days.

(21) Appl. No.: 14/799,622

(22) Filed: Jul. 15, 2015

(65) Prior Publication Data

US 2016/0065009 A1  Mar. 3, 2016

(30) Foreign Application Priority Data

Aug. 29, 2014 (TW) .............. 103129939 A

(51) Int. Cl.
| | |
|---|---|
| *H02K 1/18* | (2006.01) |
| *H02K 3/34* | (2006.01) |
| *H02K 5/16* | (2006.01) |
| *H02K 5/08* | (2006.01) |

(52) U.S. Cl.
CPC .............. *H02K 1/187* (2013.01); *H02K 5/08* (2013.01); *H02K 3/34* (2013.01)

(58) Field of Classification Search
CPC ............. H02K 1/187; H02K 3/34; H02K 5/08
USPC ..................... 310/90, 215, 216.121, 216.137
See application file for complete search history.

(56) References Cited

U.S. PATENT DOCUMENTS

| | | | | |
|---|---|---|---|---|
| 6,104,570 A | * | 8/2000 | Pelstring | G11B 17/038 360/98.07 |
| 6,286,199 B1 | * | 9/2001 | Bobay | H02K 1/187 264/272.2 |
| 7,076,975 B2 | | 7/2006 | Heyder et al. | |
| 7,615,898 B2 | | 11/2009 | Chang | |
| 9,712,003 B2 | | 7/2017 | Yin et al. | |
| 2002/0050762 A1 | * | 5/2002 | Tang | H02K 5/08 310/261.1 |
| 2010/0186687 A1 | * | 7/2010 | Kim | H02K 1/278 123/41.57 |
| 2013/0285495 A1 | * | 10/2013 | Horng | H02K 3/522 310/90 |
| 2014/0015370 A1 | * | 1/2014 | Horng | H02K 1/187 310/216.113 |

FOREIGN PATENT DOCUMENTS

| | | |
|---|---|---|
| CN | 1415033 A | 4/2003 |
| CN | 102447332 A | 5/2012 |
| CN | 203774937 U | 8/2014 |

(Continued)

*Primary Examiner* — Alex W Mok
(74) *Attorney, Agent, or Firm* — Alan D. Kamrath; Kamrath IP Lawfirm, P.A.

(57) ABSTRACT

An external rotor motor includes: a shaft, an insulator and a core. The insulator is coupled with an outer peripheral surface of the shaft, the core is arranged on an outer periphery of the insulator, and the insulator is formed between the shaft and the core, so that no electrically conductive route can be formed between the core and the shaft. A rotor has a housing rotatably coupling with the shaft, with an inner peripheral wall of the housing having a permanent magnet module.

15 Claims, 6 Drawing Sheets

(56) References Cited

FOREIGN PATENT DOCUMENTS

| DE | 10338140 A1 * | 3/2005 | ............. H02K 1/187 |
|----|---------------|--------|--------------------------|
| JP | 2000032692 A | 1/2000 | |
| JP | 2006149008 A | 6/2006 | |
| TW | M354002 U | 4/2009 | |
| TW | I326959 B | 7/2010 | |
| TW | 201328119 A1 | 7/2013 | |

* cited by examiner

EXTERNAL ROTOR MOTOR

CROSS REFERENCE TO RELATED APPLICATIONS

The application claims the benefit of Taiwan application serial No. 103129939, filed Aug. 29, 2014, the subject matter of which is incorporated herein by reference.

BACKGROUND OF THE INVENTION

1. Field of the Invention

The present invention generally relates to an external rotor motor and, more particularly, to an external rotor motor able to avoid the formation of an electrically conductive route between the core and the shaft.

2. Description of the Related Art

Referring to FIG. 1, a conventional external rotor motor 8 is shown. This external rotor motor 8 roughly includes a stator 81 and a rotor 82. The stator 81 includes a core 811 wired by a coil 812, and a shaft 813 is arranged in the center of the core 811. The rotor 82 has an upper housing 821, a lower housing 822 and a middle ring 823. The middle ring 823 links and is between the upper housing 821 and the lower housing 822. Each of the upper and lower housings 821, 822 has a bearing 824 for the shaft 813 to pass through, so that the core 811 can be positioned between the upper and lower housings 821, 822. An embodiment of said external rotor motor 8 has been disclosed by Taiwan patent no. 1326959, entitled "Improvement of Stator and Rotor of DC Brushless Motor for Ceiling Fan."

The core 811 of the above external rotor motor 8 is directly coupled with an outer periphery 813a of the shaft 813 by press fit, and, thus, the core 811 can firmly mount on the shaft 813. However, there are power wires inside the shaft 813 usually, while the core 811 is made by silicon steel sheets that are conductive material, and, thus, electromagnetic interference to the core 811 is easily induced when there are currents in the power wires inside the shaft 813. As a result, the external rotor motor 8 may produce noise or vibration in operation, thus, further resulting in negative effects to the operational stability of the external rotor motor 8.

Moreover, since the core 811 is made of conductive material such as silicon steel sheets and the shaft 813 is made of metal, the core 811 and the shaft 813 may jointly form a conductive circuit once the electrical insulation coating of the coil 812 outside the core 811 is damaged and exposes the conductive material therein. Therefore, under the above situation, electric leakage can be easily caused by the exposed conductive material of the coil 812, and the leakage current from the coil 812 will be transferred to the outside of the external rotor motor 8 through the core 811 and the shaft 813. As a result, the usage safety of the external rotor motor 8 may largely decrease.

Please further refer to another conventional external rotor motor 9 shown by FIG. 2. This conventional external rotor motor 9 briefly includes a stator unit 91, a rotor unit 92 and a control unit 93. The stator unit 91 also has a core 911, a coil 912 wiring the core 911, and a shaft 913 arranged in the center of the core 911. The rotor unit 92 is rotatably arranged around the shaft 913, and includes an upper housing 921, a lower housing 922 and a middle ring 923 linking between the upper housing 921 and the lower housing 922. The upper housing 921 and the lower housing 922 are arranged on two sides of the core 911, with the upper and lower housings 921, 922 having bearings 924 for the shaft 913 to pass through, to position the core 911 between the upper and lower housings 921, 922. The control unit 93 connects to a side of the core 911. The control unit 93 has a circuit board 931 and a shield 932, and the circuit board 931 is fixed inside the shield 932. An embodiment of said external rotor motor 9 has been disclosed by Taiwan patent no. M354002, entitled "Ceiling Fan."

The core 911 of the above external rotor motor 9 is also coupled with an outer periphery 913a of the shaft 913 by press fit. Therefore, the external rotor motor 9 may also be affected by electromagnetic interference easily, thus, further leading to bad operational stability. Specifically, since the core 911 and the shaft 913 may jointly form a conductive circuit, and since the control unit 93 on the side of the core 911 will be located in the route of the conductive circuit formed by the core 911 and the shaft 913 when the leakage current from the coil 912 is transferred by the core 911 and the shaft 913, the circuit board 931 of the control unit 93 may easily be affected by the leakage current. Therefore, the elements on the board 931 may be damaged, thus leading to a failure of the conventional external rotor motor 9.

In sum, there are drawbacks such as "bad operational stability" and "low usage safety" in the external rotor motors 8, 9, and thus, further improvements to external rotor motors are necessary to improve the market value of conventional external rotor motors.

SUMMARY OF THE INVENTION

What is needed is an external rotor motor[M] with an insulator arranged between a shaft and a core to be able to insulate the core and the shaft, to achieve the effect of improvements in the operational stability of the external rotor motor.

Another need is an external rotor motor providing an electrical insulation effect by forming the insulator between the shaft and the core, and, thus, no electrically conductive route between the core and the shaft is formed, to improve the usage safety of the external rotor motor.

In one implementation, an external rotor motor includes: a shaft, an insulator and a core. The insulator is coupled with an outer peripheral surface of the shaft, the core is arranged on an outer periphery of the insulator, and the insulator is formed between the shaft and the core, so that no electrically conductive route can be formed between the core and the shaft. A rotor has a housing rotatably coupling with the shaft, with an inner peripheral wall of the housing having a permanent magnet module.

In this implementation, one or more of the following features may be included: a center of the insulator having a through hole, with the shaft passing through the through hole, with an outer surface of the insulator forming a coupling surface, with said outer surface being away from the through hole, with the core coupling with the coupling surface, and with the insulator radially extending outwards from the outer peripheral surface of the shaft to insulate the core from the shaft in radial directions of the shaft; the shaft having a radius-extending portion, with an outer periphery of the radius-extending portion forming the outer peripheral surface, and with the shaft respectively forming a first shoulder portion and a second shoulder portion at two ends of the radius-extending portion; further comprising a first bearing and a second bearing, wherein with the first bearing arranged at the first shoulder portion of the shaft, with the second bearing arranged at the second shoulder portion of the shaft, and with the housing of the rotor connecting with outer sides of the first and second bearings; inner rings of the first and second bearings abutting against the first shoulder portion and the second shoulder portion respectively, with the housing of the rotor having an upper case, a lower case and a middle ring, with the middle ring connecting with and being located between the upper case and the lower case, with the upper case abutting against an outer ring of the first bearing, with the lower case abutting against an outer ring of the second bearing, and with the permanent magnet module being arranged on a side of the middle ring, with said side facing the core; the insulator and the outer peripheral surface of the shaft being coupled by press fit; the insulator and the outer peripheral surface of the shaft being coupled by adhesion; the shaft having a first coupling portion, with the insulator having a second coupling portion, and with the first coupling portion and the second coupling portion aligning and coupling with each other for the insulator to connect with the outer peripheral surface of the shaft; the shaft having a radial direction and an axial direction perpendicular to each other, with the first coupling portion extending outwardly in the radial direction from the outer peripheral surface of the radius-extending portion, and with the first coupling portion and the second coupling portion aligning and coupling with each other in the axial direction; the first coupling portion having a fixing hole and the second coupling portion being a through hole, so that a fixing element is able to extend through the through hole of the second coupling portion and fix to the fixing hole of the first coupling portion; a coil being wired around an outer periphery of the core; the insulator further having a bobbin for the coil to wire thereon; the bobbin being formed on the outer periphery of the core by injection molding; the bobbin being formed with the insulator integrally; the bobbin including an upper bobbin and a lower bobbin; and the upper bobbin and the lower bobbin being integrally formed with the insulator respectively.

BRIEF DESCRIPTION OF THE DRAWINGS

The present invention will become more fully understood from the detailed description given hereinafter and the accompanying drawings which are given by way of illustration only, and thus are not limitative of the present invention, including.

Figure 1:
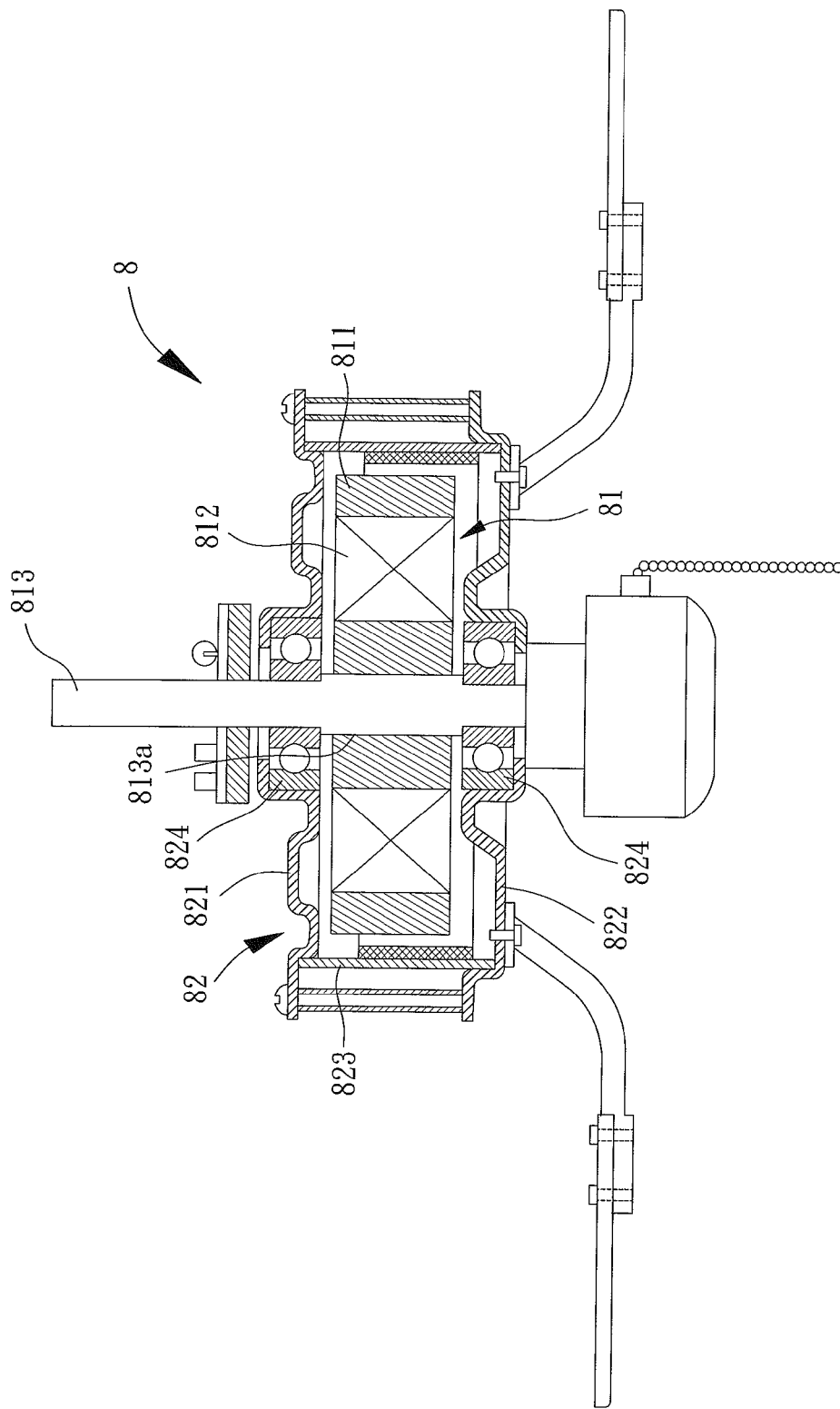
FIG. 1 is a cross-sectional view of a conventional external rotor motor.
Figure 2:
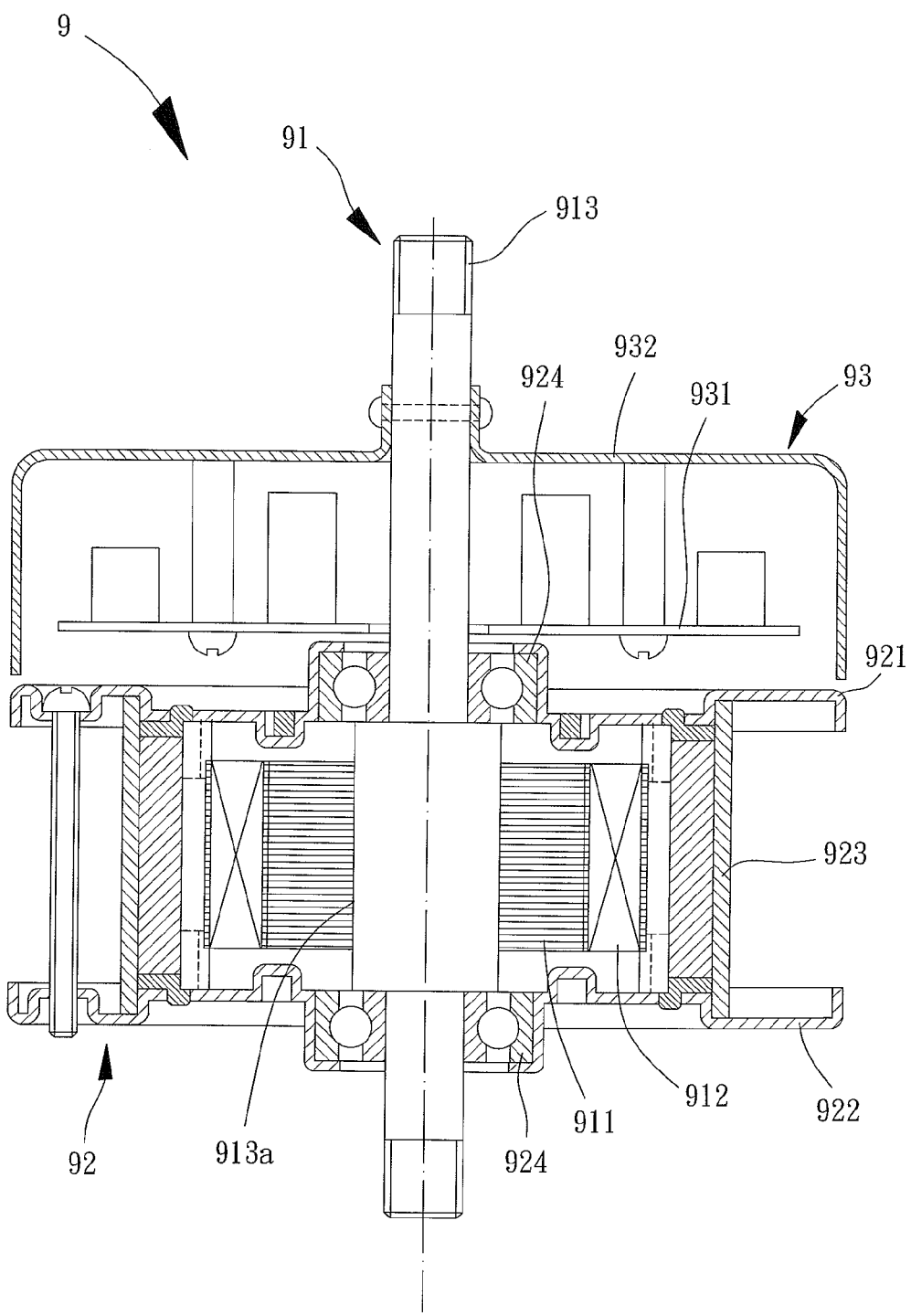
FIG. 2 is a cross-sectional view of another conventional external rotor motor.

In the various figures of the drawings, the same numerals designate the same or similar parts. Furthermore, when the term "first," "second," "inner," "outer," "external," "upper," "middle," "lower," and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 3:
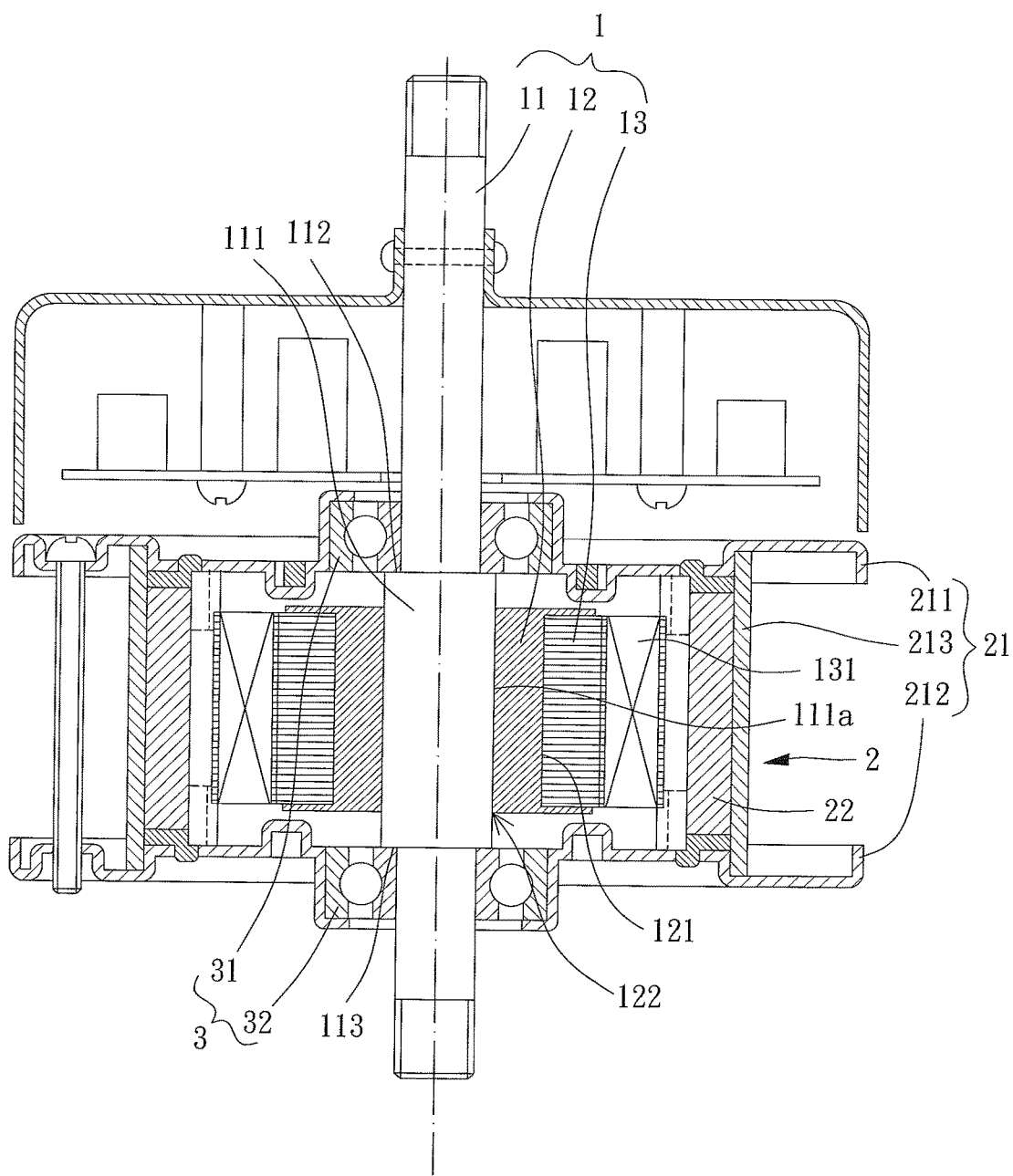
FIG. 3 is a cross-sectional view of a first embodiment of the present invention.

Referring to FIG. 3, an external rotor motor of a first embodiment of this invention is shown and includes a stator 1 and a rotor 2. The rotor 2 rotatably couples with the stator 1.

The stator 1 includes a shaft 11, an insulator 12 and a core 13, with the insulator 12 coupling with the shaft 11, and with the core 13 arranged on the outer periphery of the insulator 12. The shaft 11 has a radius-extending portion 111 whose outer periphery forms an outer peripheral surface 111a. The shaft 11 respectively forms a first shoulder portion 112 and a second shoulder portion 113 at two ends of the radius-extending portion 111, with the first shoulder portion 112 and the second shoulder portion 113 facing two ends of the shaft 11 respectively. A coil 131 is wired around the outer periphery of the core 13. The insulator 12 can be an insulating sleeve, an insulating layer or an insulating frame made of insulating material, which is not limited. The insulator 12 is coupled with the outer peripheral surface 111a of the radius-extending portion 111 of the shaft 11, and the core 13 can couple with a coupling surface 121 of the insulator 12, with the coupling surface 121 away from the shaft 11. Therefore, the insulator 12 is formed between the shaft 11 and the core 13, so that no electrically conductive route can be formed between the core 13 and the shaft 11. Specifically, the radius-extending portion 111 can be integrally formed with the shaft 11, or can be a separate member coupled to the outer periphery of the shaft 11, to form on the shaft 11 and form the first shoulder portion 112 and the second shoulder portion 113 at two ends thereof.

Particularly, the center of the insulator 12 has a through hole 122, with the through hole 122 being capable for the shaft 11 and its radius-extending portion 111 to pass through. A portion of the insulator 12 facing the through hole 122 can abut against the outer peripheral surface 111a of the radius-extending portion 111, and an outer surface of the insulator 12, which is away from the through hole 122, forms the coupling surface 121 for the core 13 to couple with.

The rotor 2 includes a housing 21 rotatably coupling with the shaft 11, with an inner peripheral wall of the housing 21 having a permanent magnet module 22. The first embodiment of the disclosed external rotor motor can further include a bearing set 3, with the bearing set 3 including a first bearing 31 and a second bearing 32. The first bearing 31 is arranged at the first shoulder portion 112 of the shaft 11, the second bearing 32 is arranged at the second shoulder portion 113 of the shaft 11, and the housing 21 of the rotor 2 connects with outer sides of the first and second bearings 31, 32. Particularly, inner rings of the first and second bearings 31, 32 abut against the first shoulder portion 112 and the second shoulder portion 113 respectively, and the housing 21 of the rotor 2 can abut against outer rings of the first and second bearings 31, 32, so that the housing 21 forms a rotatable connection with the shaft 11.

Particularly, the housing 21 of the rotor 2 can include an upper case 211, a lower case 212 and a middle ring 213 connecting with and between the upper and lower cases 211, 212. The upper case 211 abuts against the outer ring of the first bearing 31 for the upper case 211 to form a rotatable connection with the shaft 11. The lower case 212 abuts against the outer ring of the second bearing 32 for the lower case 212 to form a rotatable connection with the shaft 11. Since the middle ring 213 connects with and between the upper and lower cases 211, 212, the upper and lower cases 211, 212 and the middle ring 213 can rotate around the shaft 11 simultaneously, so that the housing 21 can form a rotatable connection with the shaft 11. The permanent magnet module 22 can be arranged on a side of the middle ring 213, with said side facing the core 13, and an air gap is formed between the permanent magnet module 22 and the core 13. Other detailed structures of the stator 1 and rotor 2 of the external rotor motor are not illustrated since they can be easily completed by one skilled in the relative art.

In this embodiment, the insulator 12 and the outer peripheral surface 111a of the radius-extending portion 111 of the shaft 11 are coupled by press fit, to couple the insulator 12 with the shaft 11. In other words, the bore of the through hole 122 of the insulator 12 is not larger than the outer diameter of the radius-extending portion 111 of the shaft 11, so that the insulator 12 can form said press fit with the radius-extending portion 111. However, the bore of the through hole 122 of the insulator 12 may be larger than the outer diameter of the radius-extending portion 111 of the shaft 11, so that the insulator 12 can connect with the outer peripheral surface 111a by adhesion.

Furthermore, the first bearing 31 and the second bearing 32 are arranged at the first shoulder portion 112 and the second shoulder portion 113 of the shaft 11 respectively. In this embodiment, although the shaft 11 respectively forms the first shoulder portion 112 and the second shoulder portion 113 by the two ends of the radius-extending portion 111, the shaft 11 can also form the first shoulder portion 112 and the second shoulder portion 113 by structures such as protrusions or positioning rings. Therefore, the shaft 11 may not need to arrange the radius-extending portion 111, and only have the insulator 12 to couple with a portion of the shaft between the first bearing 31 (first shoulder portion 112) and the second bearing 32 (second shoulder portion 113), so that the insulator 12 can couple with the outer peripheral surface 111a of the shaft 11 and be formed between the first bearing 31 and the second bearing 32.

With the above illustrated structure, in practical use of the first embodiment of the external rotor motor of the present invention, since the stator 1 has the insulator 12 and since the insulator 12 is formed between the shaft 11 and the core 13, there is no electrically conductive route between the core 13 and the shaft 11. Accordingly, since the insulator 12 can insulate the core 13 from the shaft 11, if there are power wires inside the shaft 11, the core 13 will not be affected by electromagnetic interference easily when a current passes through said power wires. In comparison with the conventional external rotor motors 8, 9 whose cores 811, 911 directly contact with outer peripheries 813a, 913a of the shafts 813, 913 so that electromagnetic interference affects the cores 811, 911 easily when currents pass through the power wires inside the shafts 813, 913, the first embodiment of the external rotor motor of the present invention can surely depress the electromagnetic interference in operation. Therefore, noise or vibration in operation is avoided, and thus operational stability is improved.

Moreover, since the insulator 12 is formed between the shaft 11 and the core 13 to provide an electrical insulation effect and thus an electrically conductive route between the core 13 and since the shaft 11 is not formed, even if conductive material of the coil 131 wiring around the core 13 is exposed because the electrical insulation coating thereof is damaged, an exposed part of the conductive material of the coil 131 does not lead to generation of leakage current due to lack of an electrically conductive route. Therefore, the usage safety of the first embodiment of the external rotor motor can be improved.

Note that the insulator 12 radially extends outwards from the outer peripheral surface 111a of the radius-extending portion 111 of the shaft 11 to insulate the core 13 from the shaft 11 in radial directions of the shaft 11, ensures that the shaft 11 and the core 13 are separated by the insulator 12 in the radial directions, and generate a sufficient spacing distance to effectively prevent the core 13 from electromagnetic interference induced by the current passing through the power wires inside the shaft 11.

Figure 4:
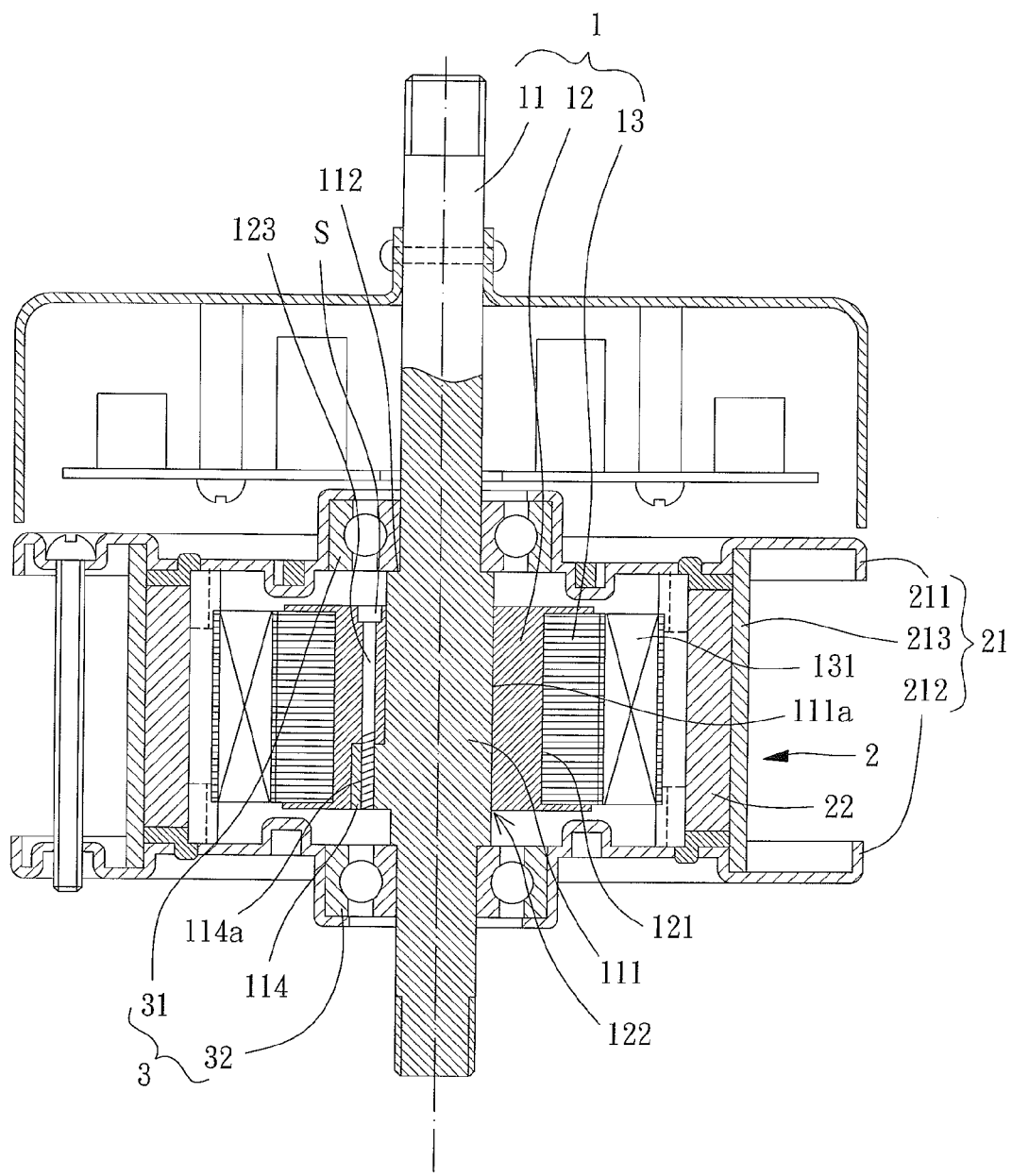
FIG. 4 is a cross-sectional view of a second embodiment of the present invention.

Referring to FIG. 4, a second embodiment of the external rotor motor of the present invention is shown, with a difference between this embodiment and the previous first embodiment lying in that: the shaft 11 has a first coupling portion 114, the shaft 11 has a radial direction and an axial direction perpendicular to each other, the first coupling portion 114 extends outwardly in the radial direction from the outer peripheral surface 111a of the radius-extending portion 111, the insulator 12 has a second coupling portion 123, and the first coupling portion 114 and the second coupling portion 123 align and couple with each other in the axial direction for the insulator 12 to connect with the outer peripheral surface 111a of the shaft 11. Specifically, in this embodiment, the first coupling portion 114 has a fixing hole 114a, and the second coupling portion 123 has a through hole for a fixing element "S" being able to extend through the through hole of the second coupling portion 123 and fix to the fixing hole 114a of the first coupling portion 114, so that the first coupling portion 114 and the second coupling portion 123 are coupled with each other. However, the first coupling portion 114 and the second coupling portion 123 may also be a pair of engagement structures corresponding to each other. Alternatively, the first and second coupling portions 114, 123 can also be connected with each other in conventional ways to fix with each other, which is not limited in the present invention.

Figure 5:
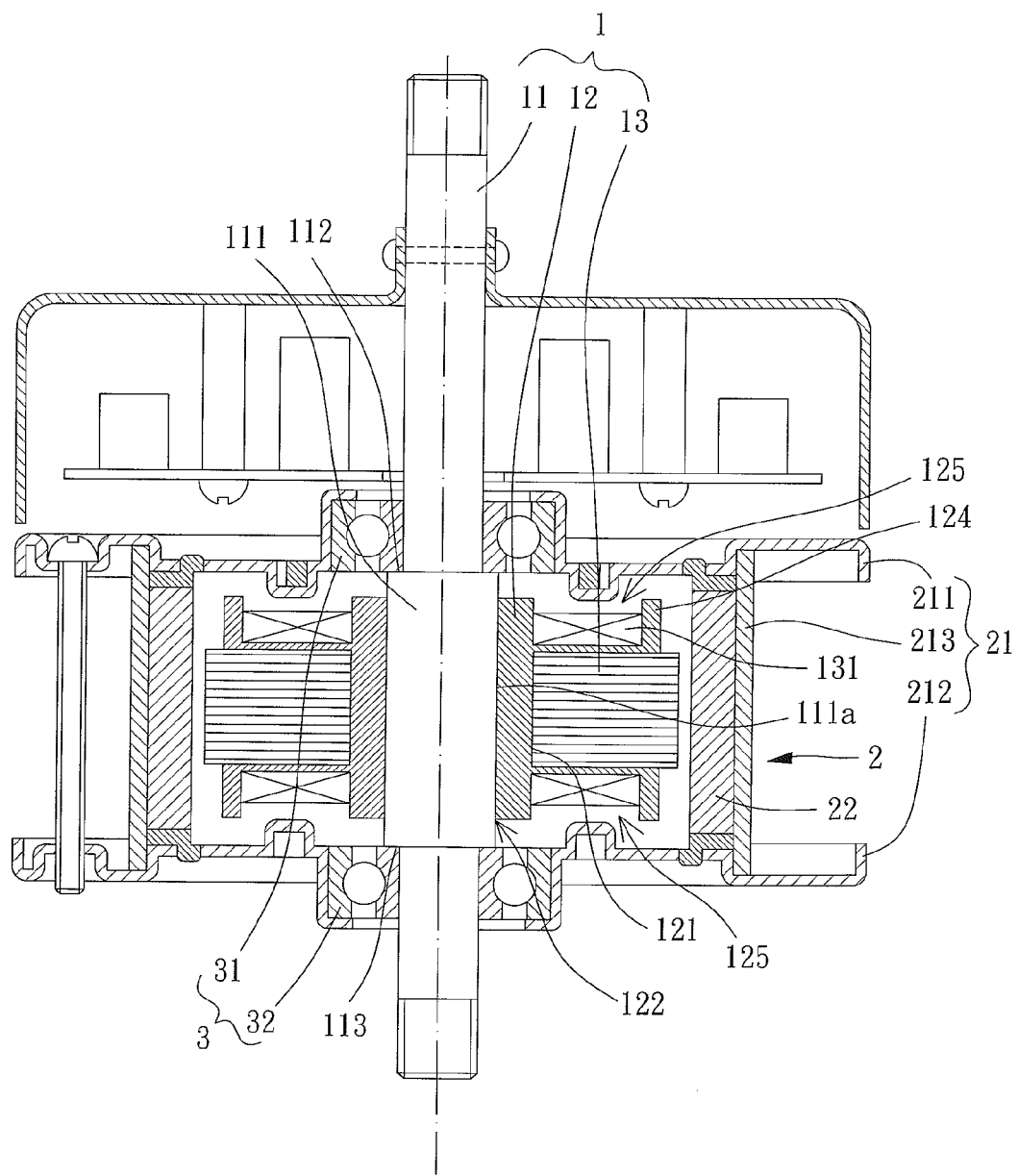
FIG. 5 is a cross-sectional view of an embodiment of the present invention with the insulator being integrally formed to serve as a bobbin of a core.

Please refer to FIG. 5. Although the insulator 12 is merely used for insulating the core 13 and the shaft 11 in the previous illustrated first and second embodiments, in parts of the embodiments of the present invention, the insulator 12 further includes a bobbin 124 formed on an outer periphery of the core 13 for the coil 131 to wire thereon. Specifically, the bobbin 124 can be formed with the insulator 12 integrally, and the insulator 12 forms a limiting portion 125 on each of two sides of the core 13 by the bobbin 124, so that the limiting portion 125 can be adapted to position the coil 131 wiring around the core 12.

Figure 6:
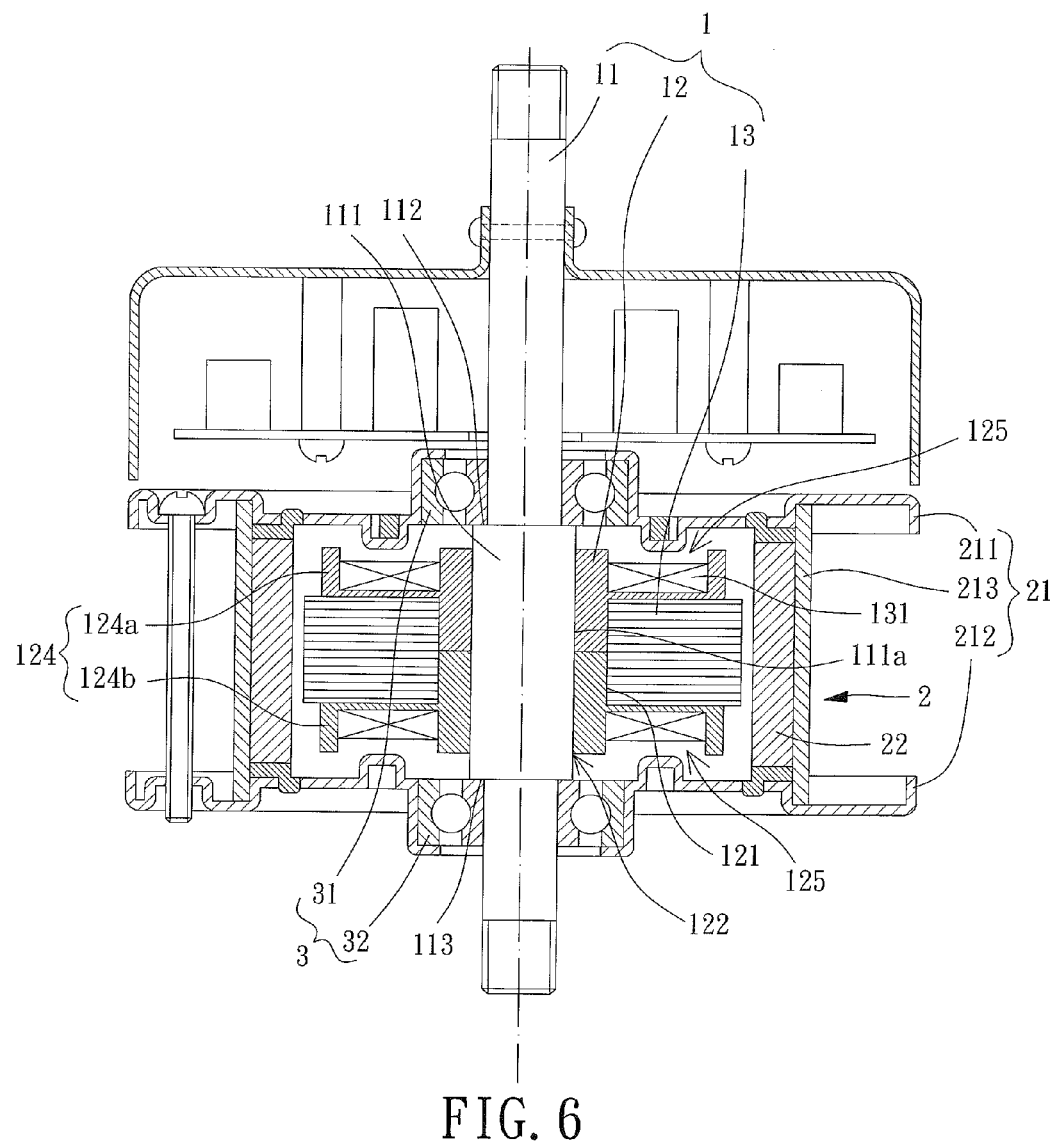
FIG. 6 is a cross-sectional view of an embodiment of the present invention with the insulator including an upper bobbin and a lower bobbin.

Furthermore, referring to FIG. 6, the bobbin 124 can be divided into an upper bobbin 124a and a lower bobbin 124b. Accordingly, the insulator 12 includes the upper bobbin 124a and the lower bobbin 124b at the same time, with the upper bobbin 124a and the lower bobbin 124b able to clamp the core 131 by two sides of the core 131, for the insulator 12 to be formed on the outer periphery of the core 13, and for the upper bobbin 124a and the lower bobbin 124b to be adapted for the core 131 to wire thereon. Specifically, the upper bobbin 124a and the lower bobbin 124b can be integrally formed with the insulator 12 respectively, and each of the upper bobbin 124a and the lower bobbin 124b forms a limiting portion 125 also adapted to position the coil 131 on the outer periphery of the core 13.

In other words, in addition to an insulation between the core 13 and the shaft 11 in the radial directions of the shaft 11, the insulator 12 can also provide a bobbin 124 for positioning the coil 131 wired around the outer periphery of the coil 13, so that the insulator 12 can decrease the manufacturing cost of the whole external rotor motor. The bobbin 124 can be a single element as shown in FIG. 5, to be formed on the outer periphery of the core 13 by integral forming. Alternatively, the insulator 12 can include the upper bobbin 124a and the lower bobbin 124b shown in FIG. 6 to clamp the core 131 by two sides of the core 131. However, the present invention is not thus limited. Particularly, the bobbin 124, upper bobbin 124a or lower bobbin 124b can also be separate parts to be coupled with the insulator 12. Additionally, the insulator 12 including the bobbin 124 can also connect with the shaft 11 by press fit, adhesion, screwing or engagement, which is not limited in the present invention.

With the previously disclosed structural features, the main characteristics of the first and second embodiments of the external rotor motor of the present disclosure lie in that: by an insulator 12 arranged between the shaft 11 and core 13 of the stator 1, the insulator 12 can insulate the core 13 and the shaft 11, so that the core 13 is not affected by electromagnetic interference easily when a current passes through said power wires. Thus, noise or vibration in operation of the external rotor motor is avoided, and operational stability of the external rotor motor is surely improved.

Furthermore, since the insulator 12 is formed between the shaft 11 and the core 13 to provide an electrical insulation effect, and, thus, an electrically conductive route between the core 13 and the shaft 11 is not formed, even if conductive material of the coil 131 wiring around the core 13 is exposed because the electrical insulation coating thereof is damaged, an exposed part of the conductive material of the coil 131 does not lead to generation of leakage current due to lack of an electrically conductive route.

In sum, the external rotor motor can surely achieve the effect of improvements in the operational stability of the external rotor motor and the usage safety thereof.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An external rotor motor comprising:
a shaft, an insulator and a core, wherein the insulator has a through hole in a center thereof, wherein the shaft passes through the through hole, wherein an inner periphery of the through hole of the insulator is directly and non-rotatably coupled with an outer peripheral surface of the shaft, wherein the core is arranged on an outer periphery of the insulator, wherein the insulator is disposed between the shaft and the core, wherein an electrically conductive route is not formed between the core and the shaft, wherein the shaft has a first coupling portion, the insulator has a second coupling portion, and the first coupling portion and the second coupling portion align and couple with each other for the insulator to connect with the outer peripheral surface of the shaft; and
a rotor having a housing rotatably coupling with the shaft, with an inner peripheral wall of the housing having a permanent magnet module.

2. The external rotor motor as claimed in claim 1, wherein an outer surface of the insulator forms a coupling surface, with said outer surface being away from the through hole, wherein the core couples with the coupling surface, and wherein the insulator radially extends outwards from the outer peripheral surface of the shaft to insulate the core from the shaft in radial directions of the shaft.

3. The external rotor motor as claimed in claim 2, wherein the insulator and the outer peripheral surface of the shaft are coupled by press fit.

4. The external rotor motor as claimed in claim 2, wherein the insulator and the outer peripheral surface of the shaft are coupled by adhesion.

5. The external rotor motor as claimed in claim 1, wherein the shaft has a radius-extending portion, an outer periphery of the radius-extending portion forms the outer peripheral surface, and the shaft respectively forms a first shoulder portion and a second shoulder portion at two ends of the radius-extending portion.

6. The external rotor motor as claimed in claim 5, further comprising a first bearing and a second bearing, wherein the first bearing is arranged at the first shoulder portion of the shaft, the second bearing is arranged at the second shoulder portion of the shaft, and the housing of the rotor connects with outer sides of the first and second bearings.

7. The external rotor motor as claimed in claim 6, wherein inner rings of the first and second bearings abut against the first shoulder portion and the second shoulder portion respectively, the housing of the rotor has an upper case, a lower case and a middle ring, the middle ring connects with and is located between the upper case and the lower case, the upper case abuts against an outer ring of the first bearing, the lower case abuts against an outer ring of the second bearing, and the permanent magnet module is arranged on a side of the middle ring, with said side facing the core.

8. The external rotor motor as claimed in claim 1, wherein the shaft has a radial direction and an axial direction perpendicular to each other, the first coupling portion extends outwardly in the radial direction from the outer peripheral surface of the radius-extending portion, and the first coupling portion and the second coupling portion align and couple with each other in the axial direction.

9. The external rotor motor as claimed in claim 8, wherein the first coupling portion has a fixing hole and the second coupling portion is a through hole, and wherein a fixing element extends through the through hole of the second coupling portion and fixes the fixing hole of the first coupling portion.

10. The external rotor motor as claimed in claim 1, wherein a coil is wired around an outer periphery of the core.

11. The external rotor motor as claimed in claim 10, wherein the insulator further has a bobbin for the coil to wire thereon.

12. The external rotor motor as claimed in claim 11, wherein the bobbin is formed on the outer periphery of the core by injection molding.

13. The external rotor motor as claimed in claim 12, wherein the bobbin is formed with the insulator integrally.

14. The external rotor motor as claimed in claim 11, wherein the bobbin comprises an upper bobbin and a lower bobbin.

15. The external rotor motor as claimed in claim 14, wherein the upper bobbin and the lower bobbin are integrally formed with the insulator respectively.

* * * * *